*Reissue* *Adolph Pearl.*

*Impt in Apparatus for Pressing, Shaping & Drying Cigar Bunches.*

4458

REISSUED JUL 4 1871

Witnesses
Fred Haynes
R. A. Rahman

Adolph Pearl

UNITED STATES PATENT OFFICE.

ADOLPH PEARL, OF NEW YORK, N. Y., ASSIGNOR TO HENRY PEARL.

IMPROVEMENT IN APPARATUS FOR PRESSING, SHAPING, AND DRYING CIGAR-BUNCHES.

Specification forming part of Letters Patent No. 108,290, dated October 11, 1870; reissue No. 4,458, dated July 4, 1871.

*To all whom it may concern:*

Be it known that I, ADOLPH PEARL, of the city, county, and State of New York, have invented a new and useful Improvement in Apparatus for Pressing, Shaping, and Drying Cigar-Bunches; and I do hereby declare that the following is a full, clear, and exact description of the same, reference being had to the accompanying drawing forming part of this specification.

This invention is more especially intended for pressing, shaping, and drying the bunches produced by the machine which is the subject of my Letters Patent No. 103,236, dated May 17, 1870, though it may be employed for receiving and holding cigar-bunches or fillers produced by other means.

The invention comprises a mold or series of independent molds of an internal configuration which is the counterpart of the form of the cigar to be produced. The external configuration of the mold in its transverse section is immaterial so long as it forms on its surface or portions of its surface a tapering construction. Each mold is divided longitudinally into two or more parts or sections, to provide for the introduction and removal of the bunch, and is preferably open at one of its ends to facilitate the drying of the bunch by evaporation. After the bunch, with or without a binder, has been inserted in said mold, the latter, being closed, is introduced for a portion of its length, with the smallest end of its taper or tapering portion foremost, through a hole or opening in a table, rack, or stand, which serves to hold the divided mold and act upon the bunch, as required, till sufficiently dried to receive the wrapper and retain its proper form without the aid of the mold.

Figure 2:
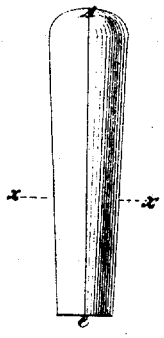
Figure 4:
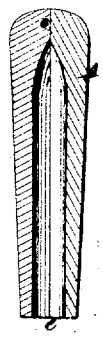
Figure 3:
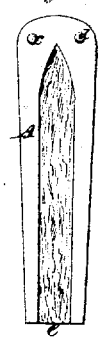
Figure 5:
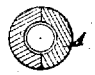
Figure 6:
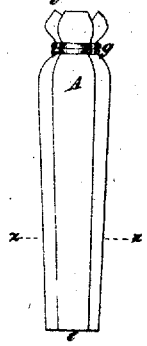
Figure 7:
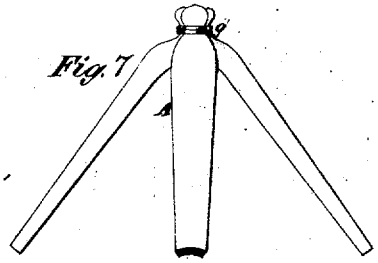
Figure 8:
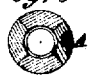
Figure 1:
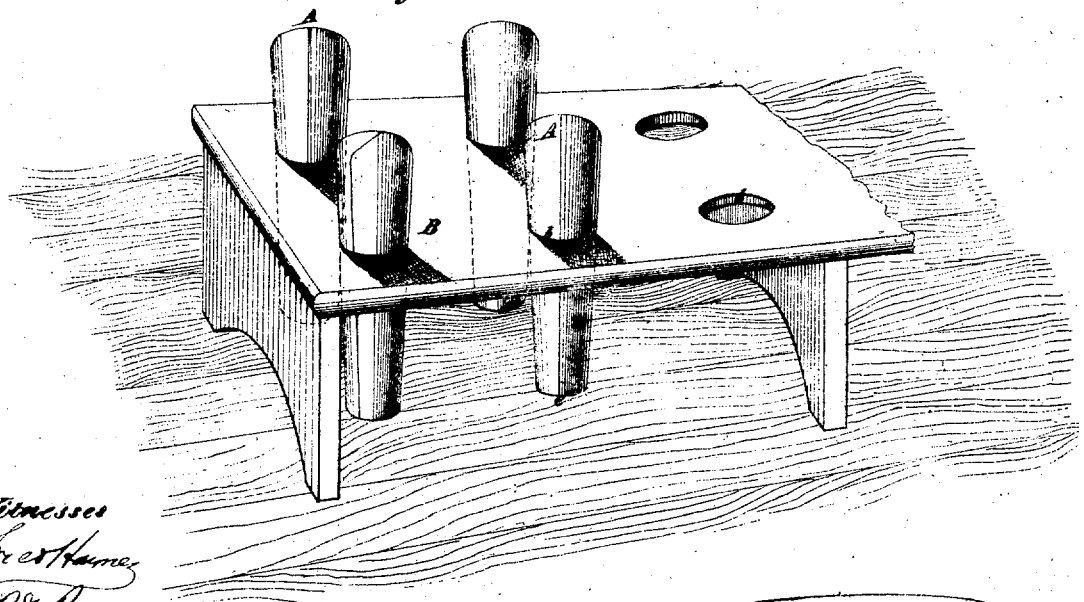

Figure 1 in the accompanying drawing represents a view in perspective of a series of molds for holding cigar-bunches or fillers in accordance with my invention, said molds being shown as in their places within or through a perforated table. Figs. 2, 3, 4, and 5 represent a longitudinal outside view of a closed mold, a longitudinal section thereof, a face view of one-half of the mold, and a transverse section taken, as indicated, by the line *x x* in Fig. 1. Figs. 6, 7, and 8 represent an outside longitudinal view of a mold under a modified form of construction, closed, a view of the same open, and a transverse section through the line *z z* in Fig. 6.

Similar letters of reference indicate corresponding parts.

Referring, in the first instance, to Figs. 1, 2, 3, 4, and 5 of the drawing, A A represent molds formed of any suitable material or compound, to effect the drying and shaping of the bunches within them. A compound of sawdust and any suitable adhesive substance will answer the purpose. These molds, which are divided longitudinally into two or more parts, are of an interior configuration which is the counterpart of the form of the cigar to be produced, while externally, or for sufficient portions of their exterior, they are of a slightly-tapering shape, so that, when inserted, with the smallest ends of their tapering portions foremost, through the spaces of a rack or holes, *b b*, in a stand or table, B, they are jammed in said holes, and, by the forcing of their sections together, made to press or bind on the bunches, or bunches surrounded by their binders contained within the molds. The mold-sections may have their proper relative positions secured to them by a dowel, *c*, in either section, made to fit a hole, *d*, of corresponding shape, in the other section, the holes *b* in the table, and tapering configuration of the molds on their exterior or portions thereof, further serving to adjust the divided halves or portions of the molds. Said molds are left open at their one end, *e*, to expedite drying the bunches within them. In Figs. 6, 7, and 8 the mold is represented as divided longitudinally into several parts, and united by an elastic band, *g*, at its closed end, whereby a very effective distribution of the closing pressure on the tobacco is produced, and on drawing the mold out of the hole *b* in the table it readily springs apart to release the bunch.

By thus employing molds constructed substantially as herein described the bunch, with or without the binder on it, may be pressed, shaped, and dried at one and the same time, ready and in proper form for the wrapper or finishing process.

What is here claimed, and desired to be secured by Letters Patent, is—

The combination of the longitudinally-divided, externally, taper-mold and the table-rack or stand having openings for the reception of such molds, substantially as and for the purpose herein set forth.

ADOLPH PEARL.

Witnesses:
FRED. HAYNES,
FERD. TUSCH.